United States Patent
Berkes

[15] 3,691,866
[45] Sept. 19, 1972

[54] TILT STEERING WHEEL MECHANISM

[72] Inventor: Benjamin L. Berkes, Sagamore Hills, Ohio

[73] Assignee: General Motors Corporation, Detroit, Mich.

[22] Filed: July 2, 1971

[21] Appl. No.: 159,230

[52] U.S. Cl..................74/493, 180/78, 280/87 A, 287/14
[51] Int. Cl. ..............................................B62d 1/18
[58] Field of Search .74/493, 492; 280/87 A; 180/78; 287/14

[56] References Cited

UNITED STATES PATENTS

| | | |
|---|---|---|
| 2,865,222 | 12/1958 | Bachman......................74/493 |
| 3,504,569 | 4/1970 | Zoltok..........................74/493 |
| 3,533,302 | 10/1970 | Hansen........................74/493 |

*Primary Examiner*—Milton Kaufman
*Attorney*—J. L. Carpenter et al.

[57] ABSTRACT

A tilt steering wheel mechanism having a column, the lower end of which is connected to an adjuster mechanism having a guide plate and a lock pin cooperating with the guide plate permitting the column to be pivoted to predetermined points about a horizontal axis for maintaining the wheel in an adjusted position.

3 Claims, 6 Drawing Figures

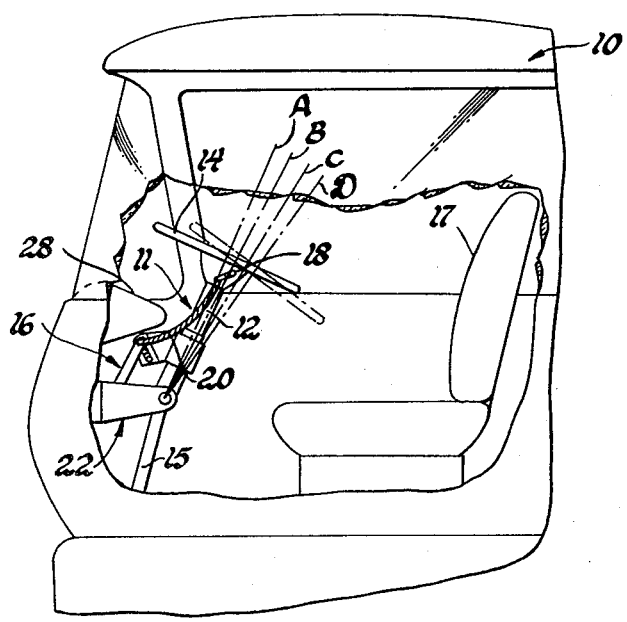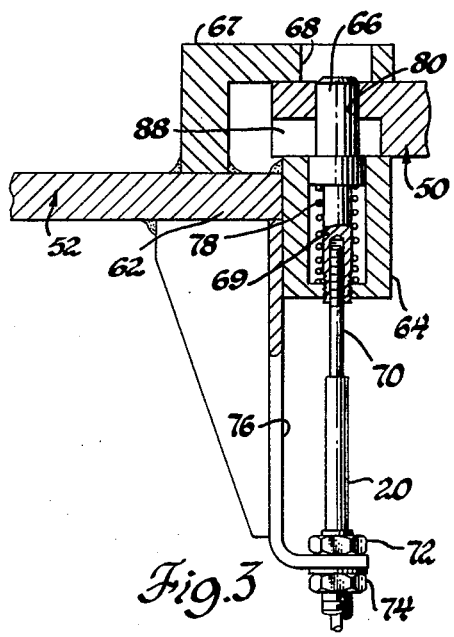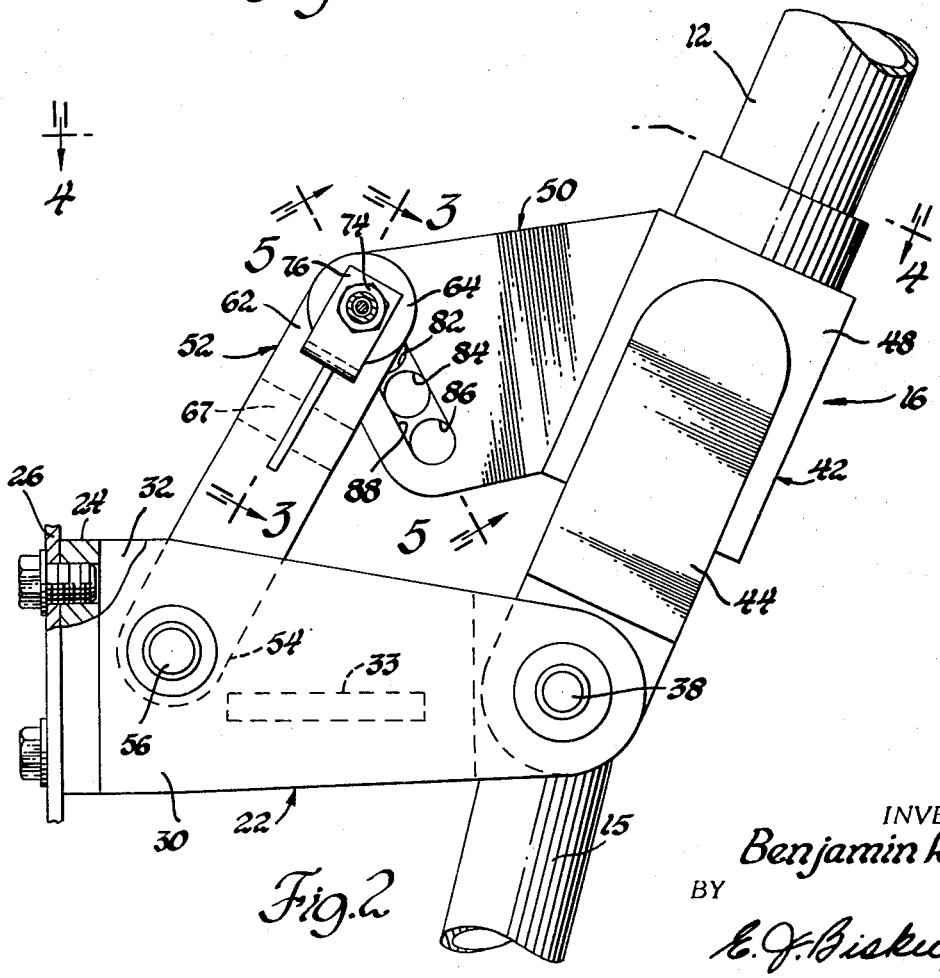

INVENTOR.
Benjamin L. Berkes
BY
C. J. Biskup
ATTORNEY

TILT STEERING WHEEL MECHANISM

This invention concerns a tilt steering wheel mechanism of the type that can be employed with a vehicle and permits the steering wheel to be adjustably positioned about a horizontal axis so as to locate the steering wheel in a comfortable driving position and also to facilitate access to and egress from the driver's station. More particularly, the tilt steering wheel mechanism made in accordance with the invention includes a steering wheel which is rotatably supported at the upper end of a column. A bracket supports the lower end of the column for pivotal movement about a horizontal axis extending transversely to the longitudinal axis of the vehicle. A guide plate is formed with the lower end of the column and located in the plane of movement of the column. The guide plate has a guide slot formed in one side thereof and a series of openings are formed in the guide slot, with each opening representing a position of the steering wheel to which the latter can be moved. One end of a link is pivotally carried by the bracket, while the other end of the link includes a spring biased lock pin which is manually operated and adapted to be inserted into one of the openings in the guide slot for positioning the steering wheel in a desired position about the aforementioned horizontal axis.

The objects of the present invention are to provide a tilt steering wheel mechanism that supports the lower end of a steering column and includes a manually operable latch in the form of a pin and slot connection for adjusting the steering wheel about a horizontal axis; to provide an adjuster mechanism for tilting a steering wheel assembly about a horizontal axis and that is mountable to the vehicle forwardly of the steering column; to provide a mechanism for adjusting the position of a steering wheel which incorporates a latching means having a lock pin that is movable into one of a series of openings formed in a guide slot for positioning the steering wheel about a horizontal axis; and to provide an adjuster device for moving a steering wheel column about a horizontal axis that includes a latching means having a lock pin that is adapted to lock the column in the adjusted position and also serves to guide movement of the column when the latter is being moved to a new position.

Other objects and advantages of the present invention will be apparent from the following detailed description when taken with the drawings in which:

FIG. 1 shows the cab portion of a vehicle incorporating a tilt steering wheel mechanism made in accordance with the invention;

FIG. 2 is an enlarged elevational view showing the tilt steering wheel mechanism of FIG. 1;

FIG. 3 is a sectional view taken on line 3—3 of FIG. 2 and shows the latch which forms a part of the tilt steering wheel mechanism;

Figure 4:
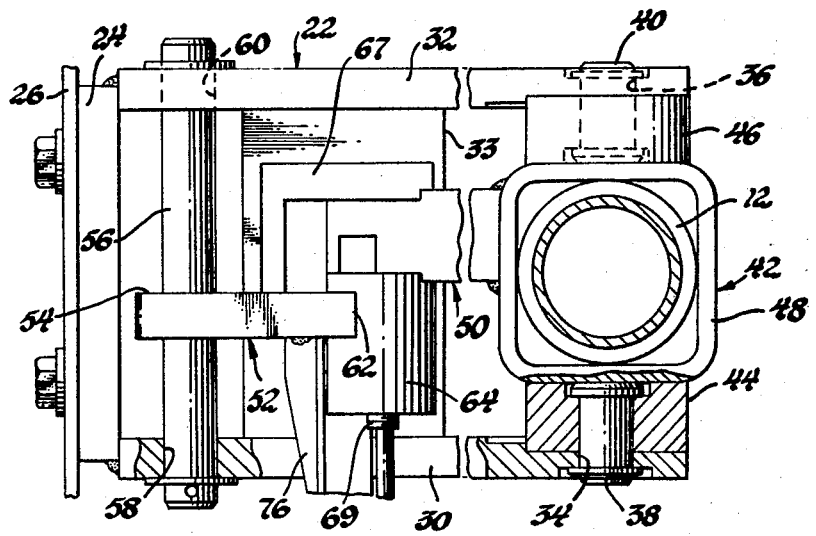
Figure 5:
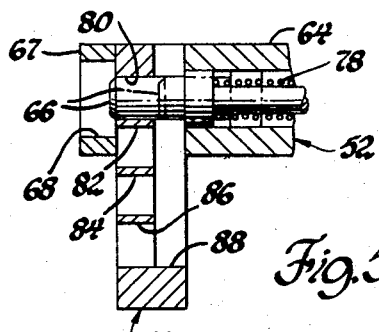
Figure 6:
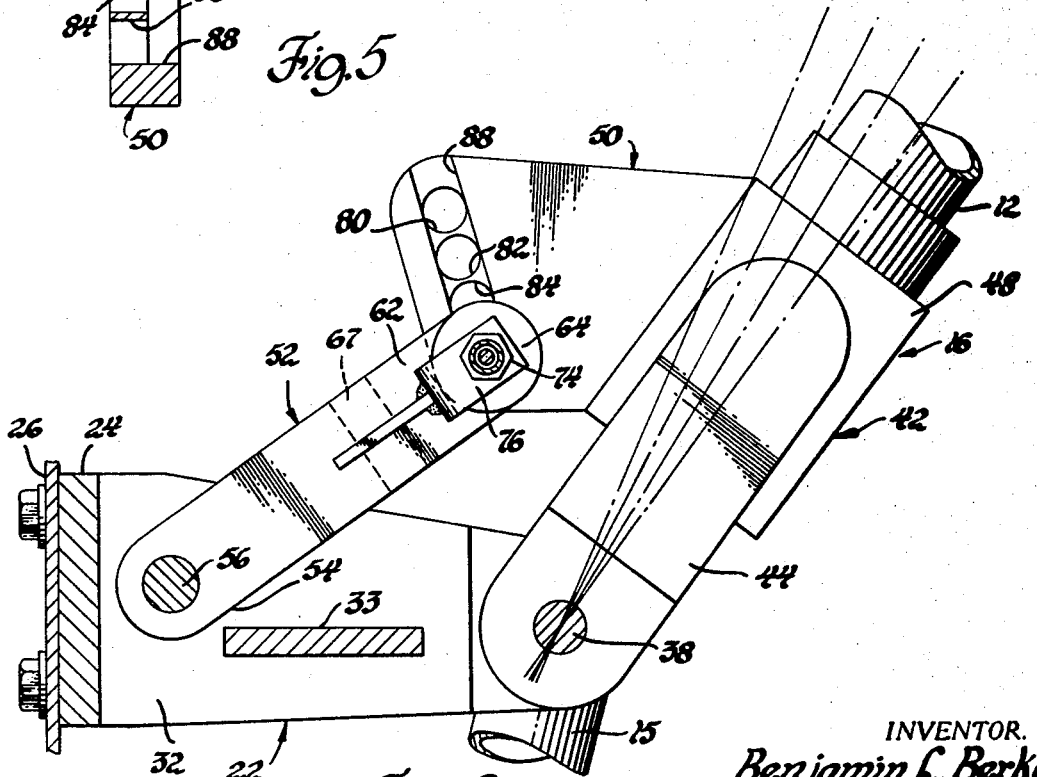

FIGS. 4 and 5 are sectional views taken on lines 4—4 and 5—5 respectively of FIG. 2; and FIG. 6 is a view similar to FIG. 2 but shows the steering column in a different position as provided by the tilt steering wheel mechanism.

Referring now to the drawings and more particularly to FIG. 1 thereof, a cab portion 10 of a vehicle is shown incorporating a steering column assembly 11 including a column 12, the upper end of which has a rotatable steering wheel 14. The lower end of the column 12 is connected to a column 15 through a tilt steering wheel mechanism 16 made in accordance with the invention which permits the steering column assembly 11 to be adjusted to various positions about a horizontal axis extending transversely to the longitudinal axis of the vehicle. As seen, the mechanism 16 allows for movement of the steering wheel 14 between two extreme positions, one of which is indicated in full lines and the other in phantom lines. Thus, the vehicle operator when sitting in the driver's seat 17, is able to position the steering wheel 14 in a location which is most comfortable for driving and such positioning can be accomplished by use of an actuator 18 mounted on column 12 and connected through a Bowden cable 20 to the mechanism 16.

As seen in FIGS. 2 through 5, the mechanism 16 includes a U-shaped support bracket 22, the base portion 24 of which is rigidly secured to a vertically oriented support plate 26 located below an instrument panel 28. The arms 30 and 32 of the support bracket 22 are interconnected by a cross bar 33 and have the rear thereof formed with axially aligned bores 34 and 36 which respectively accommodate the pivot pins 38 and 40 of a trunnion 42. As best seen in FIGS. 2 and 4, the trunnion 42 comprises a pair of laterally spaced support arms 44 and 46 rigidly secured to the sides of a generally rectangular collar 48 which is rigid with the lower end of the column 12. As is conventional, the column 12 supports a rotatable upper steering shaft (not shown) which is connected at its upper end to the steering wheel 14. The lower end of the upper steering shaft is connected through a universal joint (not shown) to the upper end of a lower steering shaft rotatably mounted in the column 15. As should be apparent, the universal joint would be so located whereby the steering column assembly 11 is movable about the aforementioned horizontal axis which extends through the longitudinal center of the pivot pins 38 and 40.

In order to lock the steering column assembly 11 in an adjusted position about the aforementioned horizontal axis, a latching means is provided which includes a guide arm 50 and a link 52. As seen in FIGS. 4 and 6, the guide arm 50 is rigidly secured to the collar 48 and is located in the vertical plane of movement of the column 12 as provided by the pivot pins 38 and 40. The link 52 has one end 54 thereof secured to a transverse shaft 56, the opposite ends of which are rotatably received within axially aligned bores 58 and 60 formed in the arms 30 and 32 respectively of the support bracket 22. The other end 62 of the link 52 rigidly carries a housing 64 which reciprocally supports a lock pin 66. An L-shaped flange 67 is also secured to the link 52 and cooperates with the housing 64 for defining a gap within which the guide arm 50 is slidably located. As seen in FIG. 3, the flange has an aperture 68 that is axially aligned with the lock pin 66.

As seen in FIG. 3, the lock pin 66 has a shank 69 that is threadably connected to the flexible wire portion 70 of the Bowden cable 20, the sheath portion of which is secured by nuts 72 and 74 to an L-shaped leg 76 rigid with the link 52. A coil spring 78 is wound about the shank 69 and normally biases the lock pin 66 into the extended position shown in FIG. 3. In such position, the lock pin 66 would be located within one of four circular openings 80, 82, 84 and 86 formed in an elongated slot 88 located in the guide arm 50. The spring 78 and the chamber in housing 64 in which the spring 78 is located are dimensioned so that upon retraction of the lock pin 66, as seen in FIG. 5, the head of the lock pin 66 is moved completely out of the accommodating opening but maintains engagement with the side walls of the guide slot 88.

From the above description, it should be apparent that with the parts located as shown in FIGS. 1 and 2, the steering column assembly 11 is locked in the extreme forward position. As aforementioned, there are four openings 80, 82, 84 and 86 formed in the guide arm 50 and, accordingly, the steering wheel 14 can be positioned in four positions as represented by the lines A, B, C, and D shown in FIG. 1. Assuming that it is desired to move the steering wheel 14 from the position A to the position D, which is the extreme rearward position, the actuator 18 is manually pulled so as to cause the wire 70 of the Bowden cable 20 to retract the lock pin 66 from opening 80 against the bias of the spring 78. This action causes the lock pin 66 to assume the phantom line position of FIG. 5 and permits the operator then to manually shift the steering wheel 14 so that the column 12 pivots in a clockwise direction about the pivot pins 38 and 40. During such movement, the lock pin 66 is drawn downwardly in the guide slot 88 until it reaches the lower limit thereof at which time the lock pin 66 is axially aligned with the opening 86. The operator then releases the actuator 18 permitting the spring 78 to extend the lock pin 66 into the opening 86 in the guide slot 88 to thereby lock the steering column assembly 11 in the position shown in FIG. 6. To return the steering column assembly 11 to the extreme forward position A of FIG. 2 or to the intermediate positions indicated by lines B and C, the actuator 18 would once again have to be pulled outwardly so as to retract the lock pin 66 from opening 86. Thereafter, the steering column assembly 11 would be moved so that the column 12 pivots in a counterclockwise direction about the pivot pins 38 and 40. The actuator 18 would then be released when the steering wheel 14 reaches the desired position so as to again permit the lock pin 66 to move into the accommodating opening for the position desired.

Various changes and modifications can be made in this construction without departing from the spirit of the invention. Such changes and modifications are contemplated by the inventor and he does not wish to be limited except by the scope of the appended claims.

I claim:

1. A tilt steering wheel mechanism for a vehicle including a steering wheel rotatably supported at the upper end of a column, a bracket supporting the lower end of said column for pivotal movement about a horizontal axis extending transversely to the longitudinal axis of the vehicle, a guide plate projecting from said column and located in a plane perpendicular to said horizontal axis and having a guide slot formed therein, a plurality of opening formed in said guide slot with each opening representing an adjusted position of the column about said horizontal axis, a link having one end pivotally carried by said bracket, latching means on the other end of the link and having a lock pin engageable with one of said openings in said guide slot for maintaining the column in a predetermined position, and a remotely located actuator connected to said lock pin for retracting the latter from said one of said openings so as to permit the column to be adjusted in position about said horizontal axis.

2. A tilt steering wheel mechanism for a vehicle including a steering wheel rotatably supported at the upper end of a column, a bracket supporting the lower end of said column for pivotal movement about a horizontal axis extending transversely to the longitudinal axis of the vehicle, a guide plate projecting from said column in the plane of pivotal movement of the column and having a guide slot formed therein, a plurality of openings formed in said guide slot with each opening representing an adjusted position of the column about said horizontal axis, a link having one end pivotally carried by said bracket, latching means on the other end of the link and having a reciprocably supported lock pin engageable with one of said openings in said guide slot for maintaining the column in a predetermined position, and a remotely located actuator operatively connected to said lock pin for retracting the latter from said one of said openings without removing the lock pin from the guide slot so as to permit the column to be adjusted in position about said horizontal axis.

3. A tilt steering wheel mechanism for a vehicle including a steering wheel assembly having a wheel rotatably supported at the upper end of a column, a bracket supporting the lower end of said column for pivotal movement about a horizontal axis extending transversely to the longitudinal axis of the vehicle, a guide plate rigidly connected to said column and located in a plane perpendicular to said horizontal axis and having an elongated guide slot formed in one side thereof, a plurality of aligned openings formed in said guide slot with each opening representing an adjusted position of the column about said horizontal axis, a link having one end carried by said bracket for pivotal movement about an axis spaced from and parallel to said horizontal axis, latching means mounted on the other end of the link and having a reciprocably supported lock pin engageable with one of said openings in said guide slot for locking the column in a predetermined position, and remotely located actuator including a flexible cable connected to said lock pin for retracting the latter from said one of said openings so as to permit the column to be adjusted in position about said horizontal axis.

* * * * *